United States Patent [19]
Draebel

[11] Patent Number: 4,953,693
[45] Date of Patent: Sep. 4, 1990

[54] MODULAR LINK CONVEYOR SYSTEM

[75] Inventor: Jorgen Draebel, Copenhagen, Denmark

[73] Assignee: Span Tech Corporation, Glasgow, Ky.

[21] Appl. No.: 300,829

[22] Filed: Jan. 23, 1989

[51] Int. Cl.⁵ .............................................. B65G 17/06
[52] U.S. Cl. ..................................... 198/853; 198/851
[58] Field of Search ......................... 198/851, 852, 853

[56] References Cited

U.S. PATENT DOCUMENTS

| | | | |
|---|---|---|---|
| Re. 30,341 | 7/1980 | Lapeyre | |
| 2,681,728 | 6/1954 | Boron | 198/851 |
| 3,467,239 | 9/1969 | Roinestad | |
| 3,529,715 | 9/1970 | Mueller | 198/852 |
| 3,669,247 | 6/1972 | Pulver | 198/852 X |
| 3,870,141 | 3/1975 | Lapeyre et al. | |
| 3,881,593 | 5/1975 | Mushovic et al. | 198/853 |
| 4,051,949 | 10/1977 | Lapeyre | |
| 4,171,045 | 10/1979 | Lapeyre | |
| 4,222,483 | 9/1980 | Wootton et al. | |
| 4,576,277 | 3/1986 | Park et al. | 198/853 X |
| 4,618,056 | 10/1986 | Cutshall | 198/853 |
| 4,742,907 | 5/1988 | Palmaer | |
| 4,754,872 | 7/1988 | Damkjaer | 198/852 |
| 4,832,187 | 5/1989 | Lapeyre | 198/853 |

FOREIGN PATENT DOCUMENTS

1359185 4/1974 United Kingdom .

OTHER PUBLICATIONS

KVP Systems, Inc. advertising publication, 5th revision, Dec., 1987, pp. 1-3.

Primary Examiner—Joseph E. Valenza
Assistant Examiner—James R. Bidwell
Attorney, Agent, or Firm—King & Schickli

[57] ABSTRACT

A conveyor system utilizing substantially V-shaped modular links is disclosed. A plurality of transversely mounted cross rods retain the links together, thereby forming the conveyor belt. The apex of each link includes an elongated slot to allow longitudinal freedom of movement to the conveyor belt. Special side links are adapted to engage conveyor guide rails integral with a support frame. Each side link is formed by including a depending arm having a transversely extending tab on a modular link. A locking tab is placed within a corresponding slot in each side link to retain the cross rod. The combination of the shape of the links and the longitudinal freedom of movement of the conveyor allows substantially unrestricted motion through curves and bends. In an alternative embodiment, upstanding fins can be provided on one or each leg of a link. The angle of the fins to the forward travel gives better lateral support to the product on the conveyor. Fins of an increased height can be provided on one or more rows to form a pusher to positively feed the product when necessary such as going up an incline. Trays can be formed by combining rows and columns of links having the fins.

27 Claims, 4 Drawing Sheets

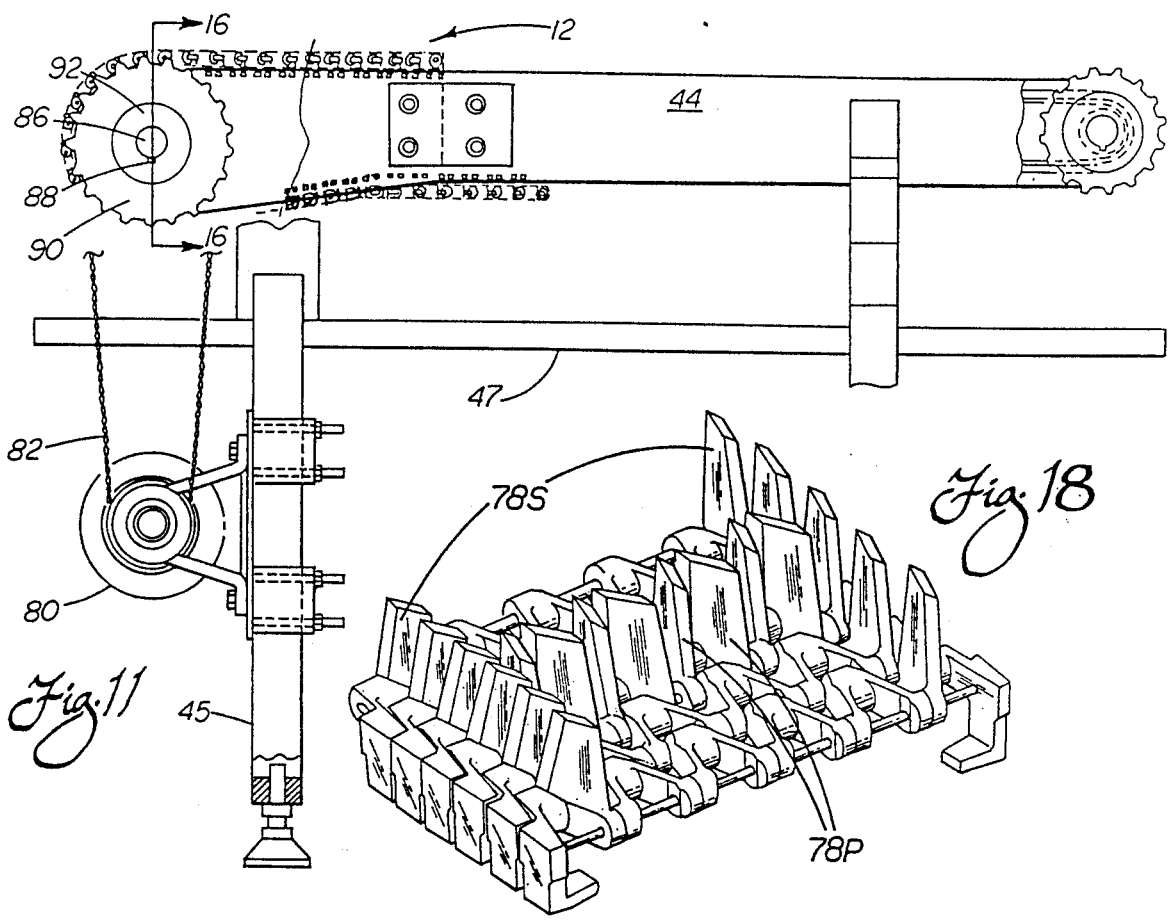

MODULAR LINK CONVEYOR SYSTEM

TECHNICAL FIELD

The present invention relates generally to conveyor systems and, more particularly, to a modular link conveyor system exhibiting a number of improved construction and operating characteristics.

BACKGROUND OF THE INVENTION

Today, conveyor systems are at the heart of many production facilities and/or techniques. As conveyor systems become more efficient, production lines can correspondingly become increasingly automated. Advantageously, this leads directly to increases in productivity and efficiency. Therefore, the desirability of efficient, reliable conveyor systems is apparent.

Despite recent developments and advances in conveyor design, further improvements in overall operating characteristics are desired. For example, most modular link conveyor systems developed to date do not traverse bends or corners well. In some cases, a curve is accomodated by interrupting the continuity of the conveyor, and providing a plurality of small, independently operating sections. This problem is compounded and the need for individual sections increased, as the width (track) of the belt increases.

Another stop-gap measure used with the prior art systems is to off-load product from one conveyor onto another by mechanical robots and the like when sharp bends are necessary. This obviously is not desirable because it adds to system complexity and expense. It also reduces operating speeds and necessarily adds a further degree of uncertainty to the system. This increases the potential for system breakdowns and/or failures.

A number of conveyor systems using modular links have been developed in the recent past. While somewhat effective, they suffer from the above limitation as well as others. For example, U.S. Pat. No. 3,870,141 to Lapeyre et al. discloses a conveyor belt composed of a plurality of individual modular links. The links include a plurality of first and second ends which tightly intermesh with those of the adjacent links, forming the belt. The links are elongated in the longitudinal direction. This elongation coupled with the tight intermeshing of the pluralities of link ends renders this type chain inappropriate for use in systems where a continuous conveyor surface moving around curves and bends are required.

In an apparent attempt to overcome the above limitations, U.S. Pat. No. 4,742,907 to Palmaer discloses a conveyor belt comprised of a plurality of intermeshing modular links. The links are specially shaped giving them a limited ability to round bends. Thus, although this conveyor exhibits a degree of improvement, it is not without its shortcomings. For example, the conveyor supporting structure is complicated and includes an unusually large number of individual components. Additionally, the conveyor belt return frame is mounted separately from the belt supply frame. This increases the complexity of the design and the expense of construction. In addition, the separate frames disadvantageously increase the installation and maintenance requirements. The height is also increased preventing use of the system in low clearance situations.

Thus, it is clear that a need exists for an improved conveyor system. Such a conveyor system would exhibit improved operation around bends or corners. Additionally, such a conveyor system would be of simple design so as to be less expensive to produce and install. The system would also be relatively compact and therefore capable of operation in a relatively small space as often found in manufacturing facilities. Further, the improved conveyor system would operate more smoothly and reliably.

SUMMARY OF THE INVENTION

It is therefore a primary object of the present invention to overcome the above described limitations and disadvantages of the prior art conveyor systems.

An additional object of the invention is to provide a conveyor system exhibiting improved operational reliability that is relatively simple and inexpensive to produce, install and maintain.

Still another object of the invention is to provide a conveyor system with a relatively lightweight and compact frame including guide tracks for both the feed and return runs of the conveyor belt.

Another object of the present invention is to provide a conveyor system utilizing modular links to provide smooth and efficient operation.

Yet another object of the present invention is to provide a conveyor system that smoothly traverses tight bends even when the conveyor belt is of a relatively wide track.

It is yet another object of the present invention to provide a conveyor system utilizing an improved wear strip exhibiting the desirable qualities of economy and ease of installation and removal and further including a visual indicating means to alert the operator that the wear strip has worn to the point where it must be replaced.

It is still another object of the present invention to provide a conveyor system operating at a constant speed thereby avoiding any tendency to accelerate or decelerate the product contained thereon.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a modular link conveyor system is provided to effect smooth, continuous motion of the endless conveyor belt even around relatively sharp bends. The conveyor system disclosed can be used in a wide variety of applications and is especially desirable in the printing industry where, for example, it is particularly advantageous to convey newly printed "signatures" to perfect binders or the like for processing in a smooth, continuous fashion.

The endless conveyor belt is formed by a plurality of interconnecting modular links. Each link is substantially V-shaped having an apex or tip and a pair of legs extending at an angle therefrom.

A plurality of transversely oriented connecting members or cross rods are provided to retain the links together, thereby forming the endless conveyor belt. The apex of each link includes a transverse slot and the distal end of each leg includes a transverse hole; the slot and holes being adapted for receiving a cross rod. Each cross rod joins the legs of the links in one row with the apexes of the links in the adjacent row to thereby form an interdigitating/interlocking conveyor belt structure. The belt so formed has a herringbone-like appearance.

Advantageously, the transverse slot provided in the apex of each of the individual links allows a degree of longitudinal freedom to the conveyor belt. More specifically, the provision of the slot allows the belt to compress differentially along the cross rod. This facilitates smooth traversal of a bend by the conveyor belt. This smooth operation is further enhanced by radiusing or relieving the corners of the slots. More specifically, the elliptical shape of the walls of the slots serve to facilitate the linear pivoting movement of the cross rods within the links as they negotiate corners in the conveyor system.

A plurality of side links are provided in order to define the peripheral edges of the belt. The side links advantageously fulfill the dual function of retaining the cross rods and guiding the conveyor belt during operation. The side links are simply formed by the inclusion of a depending arm to the conveyor modular links described above. As will be explained in more detail below, the depending arm acts as a belt guide means by slidingly engaging a conveyor guide rail. Further, a transversely extending tab is provided on the depending arm to help locate the belt and support it in the return direction.

Advantageously, an integral locking tab is retained within each side link in order to lock the cross rod into position. More specifically, the locking tab includes two prongs to mate with a locking notch provided at the end of each rod. The locking tab is fabricated from nylon or similar material and thus, the inherent resiliency of the locking tab provides the desired positive retention. The integral nature of the locking tabs which fit flush within the side links facilitates a clean, uncluttered conveyor belt. This has an advantage especially in the food service industries of providing a conveyor system that is easier to clean and further stays cleaner by the avoidance of external rod projections and associated locking hardware as required in the prior systems.

An improved conveyor frame is provided to support and guide the conveyor belt. The conveyor frame includes a pair of guide rails securely retained together by spaced, transverse beams. Advantageously, the conveyor frame supports and guides the endless conveyor belt in both the feed and return directions. More specifically, upper and lower horizontally extending lips are integrally provided on the guide rails. The upper lip acts as the upper guide for the side links as well as providing a supporting structure for the belt. The lower lip acts as a return for the conveyor belt. The transverse tabs provided on the depending arm of the side links ride on the upper surface of the lower lip in the return direction. As can be appreciated, the force of gravity tends to pull the belt downward. An advantageous benefit provided by the engagement between the transverse tabs with the lower lip of the guide rail at the point of transition between forward and return runs is the prevention of belt sag or catenary at this point in the system. This action is further aided by the belt's ability to compress due to the degree of longitudinal freedom of movement as described above. Thus, due to the cooperating engagement between the transverse tabs with the lower lip, belt catenary is prevented and the requirement of additional supporting structure for the belt return is avoided. This has the advantages of reduced system complexity, reduced over head or vertical space requirements and overall simplified installation of the system. Further, curved sections of the system are readily fabricated by simply bending the guide rails to an appropriate arc.

According to yet another important aspect of the present invention, wear strips are provided on the lips of the conveyor guide rails. The wear strips of the present invention include a U-shaped portion to clip over the lip of the rail. A depending skirt is connected to the U-shaped portion to enhance the retention of the wear strip on the rail. In this regard, a plurality of locking plates are provided to securely retain the skirt and the guide rail together. Each locking plate includes two rivets to pass through corresponding holes in the depending skirt and the guide rail and securely retain the two together. Thus, once the locking plate is installed, the wear strip is prevented from separating from the guide rail.

The locking plate additionally serves as a wear indicating means for the wear strip. As will be described in more detail below, the locking plate is fabricated from a material having a contrasting color to that of the wear strip. As the conveyor operates, the movement of the side links over the wear strip, particularly in corners, results in wear to the strip. Eventually the wear strip is sufficiently worn for the transverse tabs on the side links to begin to engage the locking plate. Over time, the tabs wear through the locking plate as well. When this occurs, a visual indication of wear is provided. More specifically, when the locking plate is worn, a contrasting stripe appears. This stripe is, of course, the depending skirt of the wear strip showing through. Because the locking plate and wear strip are of different colors, a dramatic visual contrast is presented. Thus, the operator is alerted to the fact that the wear strips need replacing and permanent damage is averted.

Advantageously, the dramatic visual effect faciliates a quick inspection of the wear strips. Due to the simple nature of the visual inspection, this inspection can be performed as often as desired. In addition to avoiding costly permanent damage, this feature serves to dramatically increase system productivity by substantially avoiding wear related system breakdowns.

Replacement of the wear strips is quite simple. The operator need only separate the belt and pull out the worn strip. This is a relatively simple procedure due to the resilient and flexible nature of the wear strip. The new strip is installed by reversing the removal procedure. Further, because the wear strip is mounted on the outside of the conveyor guide rail, installation and removal as well as visual inspection is readily accomodated.

In addition to retaining the guide rails, the transverse beams have the further function of supporting and locating one or more center rails. The center rails are provided as an additional load supporting surface for the conveyor belt. The conveyor belt slidingly rides upon the upper surface of the center rail. In this way, the center rail supports the conveyor belt when necessary such as when heavy loads are present on the belt. The engaging surface of the center rail includes a low friction cover to reduce drag and avoid undesirable excess wear of the belt.

The center rail is retained upon the transverse beams by a unique clamp assembly including a U-shaped base to surround three sides of the transverse beam. A top plate is securely attached on the top of the base. The top plate includes a retaining clip to engage the sides of the center rail cover which holds the center rail captive. A snap-fit relation retains the cover; this snapping action being facilitated by an inherent resiliency of the clip material which in the preferred embodiment is fabricated from nylon. Thus, the center rail and low friction cover are securely retained together upon the transverse beam by the snap-fit action of the retaining clip and the cover. This has a distinct advantage in that the locking action securely retains the center rail yet avoids the necessity of permanent mounting means such as bolts and/or welding. Here again, this simplifies installation. Additionally, the center rail can be moved transversely on the box beam as desired. Additional center rails can be easily installed, or rails in place removed to faciliate handling of respectively heavier or lighter objects when necessary. This gives an overall greater flexibility to the conveyor system of the present invention advantageously enhancing utility aspects.

In an alternative embodiment of the conveyor system, upstanding fins can be provided extending from the legs of the modular links. The fins provide a further degree of support for articles placed upon the conveyor. Further, fins of an even greater height may be provided on one or more rows of links to form pushers to positively convey the articles as, for example, up an incline. Alternatively or in addition, one or more columns of the links can include the fins of increased height to define two or more individual tracks upon the conveyor belt. By combining the rows and columns, individual compartments or trays can be defined. Thus, it can be seen that the conveyor system of the present invention can be readily adapted for a wide variety of applications. Additionally, by raising only the legs of the links into the fins it can be seen that the apexes being of a uniform lesser height define a multiplicity of channels. These channels can be aligned with the projecting teeth of a stationary transfer comb, for example, to faciliate smooth and efficient loading/offloading of articles to/from the conveyor.

In the preferred embodiment, an electric motor provides the driving force for the conveyor. The motor is connected by a chain to a drive shaft mounted on the conveyor frame underneath the upper conveyor belt. One or more conveyor belt engaging sprockets are placed on the drive shaft. The sprockets are securely keyed to the drive shaft in order to assure a complete and efficient transfer of torque.

The sprockets may include an integral friction clutch assembly. This clutch is provided as a failsafe mechanism. More specifically, if for some reason the conveyor belt is stopped or otherwise prevented from freely operating, the friction clutch "disengages" to allow the conveyor belt to idle without damage to the belt or motor.

During operation of the conveyor, the belt negotiates curves or bends smoothly with no buckling, hesitation or jumping. This is due to the combination of the relieved slot in the apex of the link allowing free differential motion of the rods and projecting portions of the adjacent link provided on the legs. More specifically, this link configuration substantially prevents any transverse movement between the links thereby assuring a complete "linear pivot" action. Advantageously, this linear pivoting action assures an even, continuous motion of the belt through curves and accordingly lessens the overall conveyor system power requirements because less drag is present in the system. Therefore, the conveyor system of the present invention provides improved action of the belt around bends while simultaneously lessening the power requirements of the system.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 11 is a side elevational view of the conveyor system of the present invention;

FIG. 12 is an elevational view of the center rail clamp assembly;

FIG. 13 is a top plan view showing the center rail clamp assembly mounted upon a portion of the center rail;

FIG. 18 is a perspective view of the conveyor belt of the present invention showing alternative modular link embodiments having fins of sufficient height to act as pushers when positioned in rows transversely across the belt and as retaining side walls when formed on opposite side links.

Reference will now be made in detail to the present preferred embodiment of the invention, an example of which is illustrated in the accompanying drawing.

DETAILED DESCRIPTION OF THE INVENTION

Figure 1:
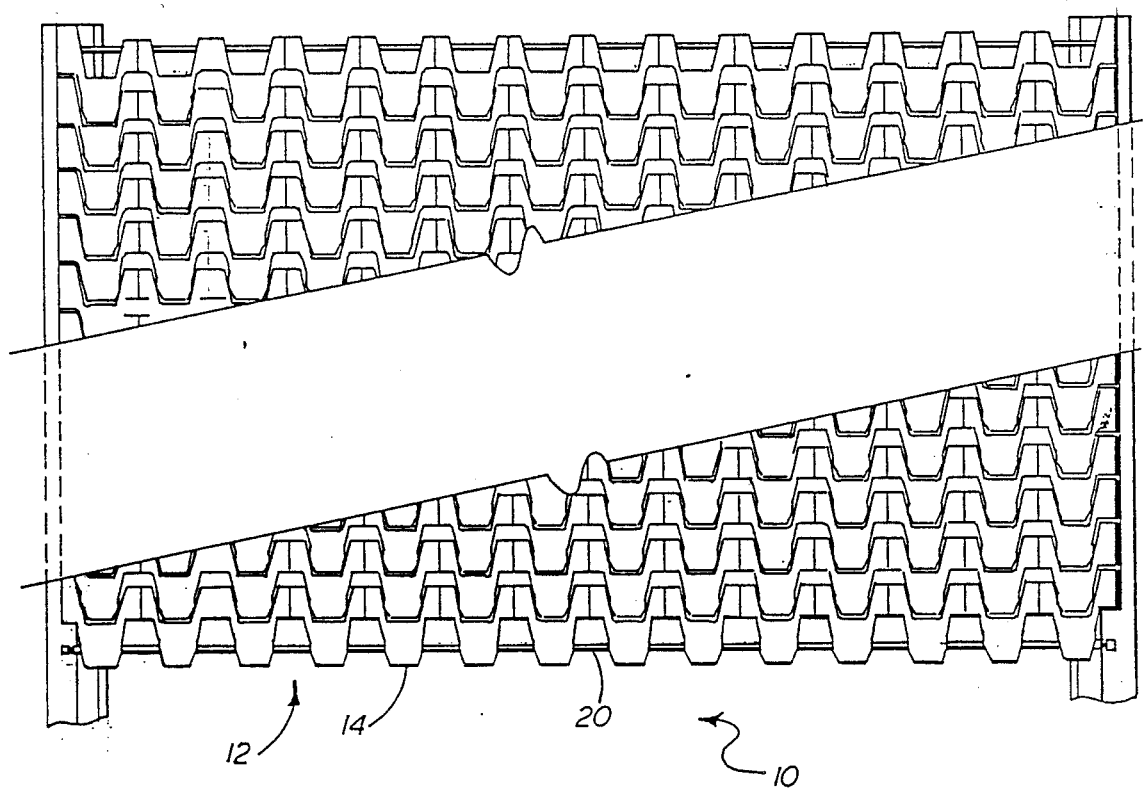
FIG. 1 is a top plan view of the conveyor system of the present invention.
Figure 10:
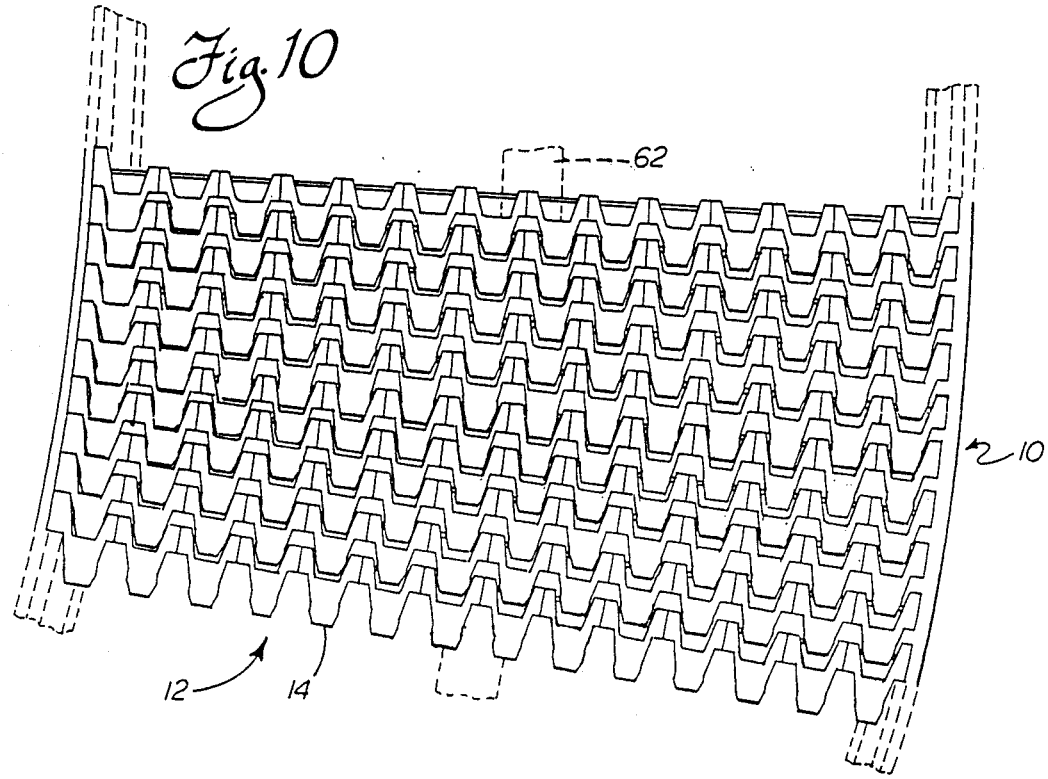
FIG. 10 is a top plan view showing the action of the conveyor belt when rounding a bend.

Reference is made to FIGS. 1 and 10 illustrating the conveyor belt of the conveyor system 10 of the present invention. As will become apparent by reviewing the description below, the modular link conveyor system 10 provides a smooth continuous motion of the endless conveyor belt 12 even around relatively sharp bends such as illustrated in FIG. 10.

Figure 2:
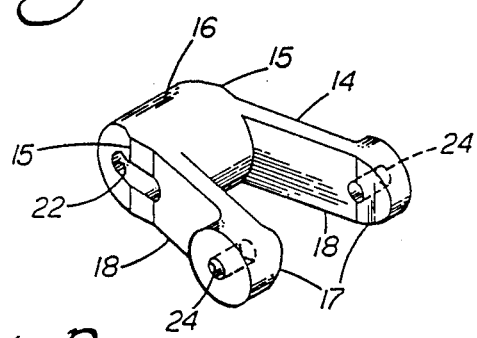
FIG. 2 is a perspective view of an individual modular link of the conveyor system of the present invention.
Figure 3:
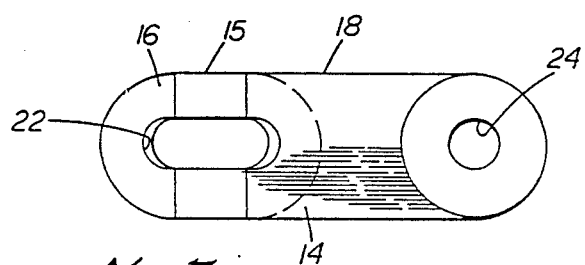
FIG. 3 is a side elevational view of a modular link of the conveyor system of the present invention.
Figure 2A:
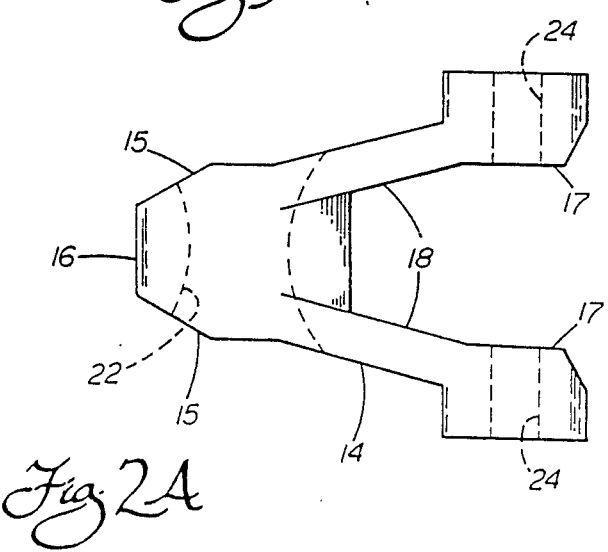
FIG. 2A is a top plan view of the modular link of the present invention.

The endless conveyor belt 12 is formed by a plurality of interconnected modular links 14 (see FIGS. 2, 2A and 3). In the preferred embodiment, the links 14 are fabricated from nylon. Thus, the links 14 are strong and durable. They are also easily cleaned of dirt and other debris. This of course is an advantage in the food services industries where a high degree of cleanliness is desirable when handling prepared food products.

As shown in FIGS. 2 and 2A, each link 14 includes a tip or apex end 16 and a pair of legs 18 extending at an angle therefrom. Thus, each link 14 is substantially V-shaped. Projections 15 and 17 extend from the apex 16 and legs 18 respectively and are provided to assure a close fit between adjacent links. As will be described in more detail below, the shape of the link 14 including the projections 15 and 17 helps assure smooth system 10 operation particularly when rounding corners.

A plurality of transverse connecting members in the form of cross rods 20 are provided to interconnect and retain the links 14 together, thereby forming the endless conveyor belt 12. In the preferred embodiment, the cross rods 20 are fabricated from stainless steel. Advantageously, this choice of material provides a substantially strong belt. Additionally, the stainless steel is not prone to oxidation and rust. Thus, the belt provides clean, substantially maintenance free operation in most environments.

As shown in FIGS. 2, 2A and 3, the apex 16 of the links 14 includes a transversely oriented slot 22 for receiving the cross rod 20. The slot 22 is elongated to allow a degree of longitudinal freedom of movement to the rod 20 and hence conveyor belt 12. Upon further inspection, it is appreciated that the slot 22 includes relieved or radiused corners to augment the freedom of movement of the rod 20 within the slot 22 during conveyor operation. Thus, corners may be rounded smoothly without buckling or jumping of the belt 12.

The distal end of each leg 18 includes a transverse hole 24 for receiving a cross rod 20. The holes 24 are coaxial such that the cross rod 20 passes freely through both holes 24. When properly connected, the cross rod 20 joins the legs 18 of the links in one row with the apexes 16 of the links in the adjacent row thereby forming the interlocking endless conveyor belt 12. The belt 12 so formed has a herringbone appearance (see FIG. 1).

During operation of the belt 12 around a bend (see FIG. 10), the cross rods 20 tend to skew with respect to the longitudinal direction. The longitudinal freedom provided by the slots 22 allows the rods to skew freely and thus the belt 12 through its links 14 compresses differentially along the rod 20. This substantially eliminates jumping and buckling and allows the desired smooth motion through bends. Further, the shape of the links 14 including projections 15, 17 prevents relative transverse link motion by maintaining close contact throughout the bend. This substantially prevents any rod 20 "hangup" so that the rods quickly and properly return to the desired transverse orientation after a bend. Thus, it should be appreciated that the slots 22 and projections 15, 17 operate together to allow the rods 20 to pivot linearly around bends with substantially even loading on the individual links 14. Consequently smooth conveyor operation is assured.

A plurality of side links 26 fulfill the dual function of guiding the conveyor belt 12 along both the feed and return runs and retaining the links 14, 26 on the rods 20. More specifically, the side links 26 include a depending arm 27 for locating and guiding the conveyor belt 12 along a cooperating guide track (described below). A transversely extending tab 28 is provided at the distal end of the depending arm 27 to further maintain the position of the belt 12 and as will be described in more detail below, retains the belt 12 on the guide track in the return direction.

Figure 7:
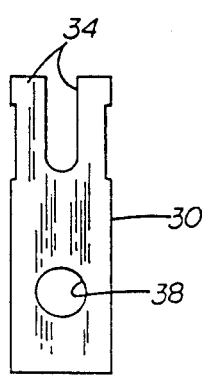
FIG. 7 is a side elevational view of the locking tab utilized in the present invention.

According to an important aspect of this invention, an integral locking tab 30 is provided within the side link 26 to retain the cross rod 20 and links 14, 26 in position. (See FIGS. 4–7.) A slot 32 is provided within the depending arm 27 to receive the locking tab 30. As shown in FIG. 7, the locking tab 30 includes prongs 34 to engage a corresponding notch 36 provided at each end of the cross rods 20. The locking tab 30 is fabricated from nylon. The inherent resiliency of this material means that the prongs 34 of the tab 30 snap lock in the notch 36 to positively connect the side link 26 and cross rod 20 together.

Figure 4:
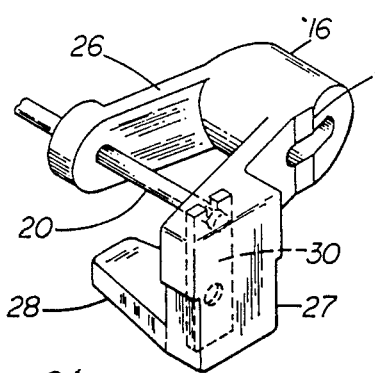
FIG. 4 is a perspective view of a side link.
Figure 5:
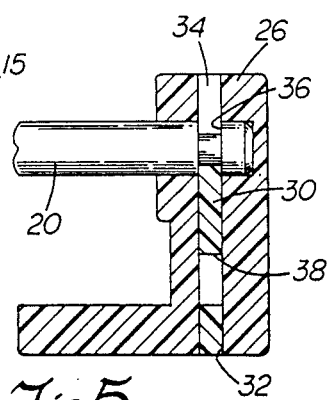
FIG. 5 is a cross sectional view of the side link taken along the axis of the transverse cross rod showing the locking tab fitted within the side link.
Figure 6:
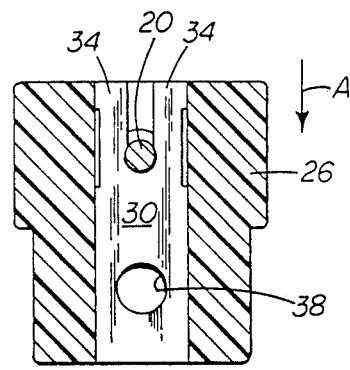
FIG. 6 is a cross sectional view of the depending arm of the side link taken along an axis perpendicular to that of FIG. 5.

As shown in FIG. 4, the locking tab 30 fits flush within the side link 26. The resulting smooth profile of the side links 26 minimizes the build-up of dirt and debris and facilitates conveyor cleaning.

The locking tabs 30 are easily installed within the slot 32 by simply pushing them in until they snap around the notch 36. They may also be easily removed to allow conveyor disassembly as, for example, for maintenance and repair. More particularly, the tab 30 is initially removed by pushing on the prongs 34 in the direction of action arrow A in FIG. 6. Once the hole 38 is exposed from the bottom face of the link 26, the hole may be engaged by a suitable implement to provide increased leverage to facilitate tab 30 removal.

Figure 9:
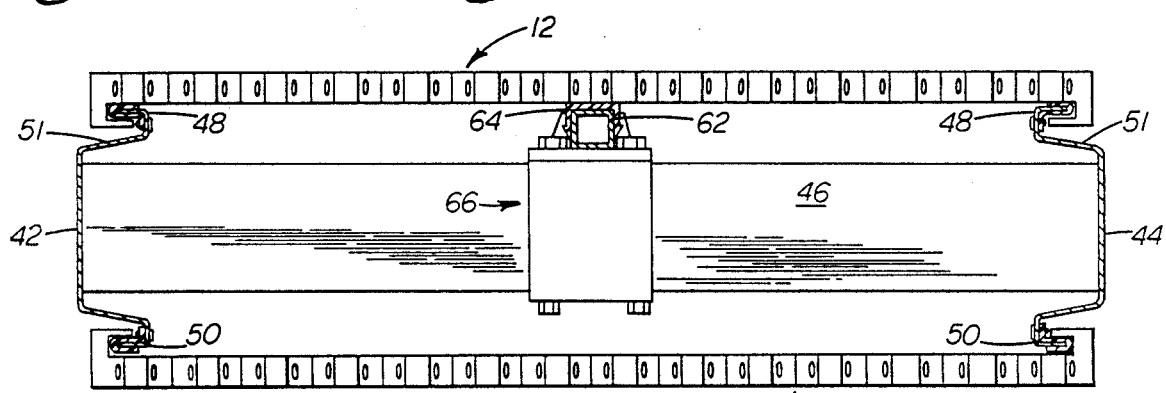
FIG. 9 is a cross sectional view of the conveyor system of the present invention showing the integral feed and return feature of the conveyor frame.

A conveyor frame 40 is provided to support and guide the conveyor belt 12 (see FIG. 9). The conveyor frame 40 includes two guide rails 42 and 44 to guide the conveyor belt 12 at its lateral edges. Legs 45 support the frame 40 at the desired level (see also FIG. 11).

As shown in FIG. 9, at least one transverse beam 46 is provided to retain and secure the guide rails 42, 44 together at the desired lateral spacing. The transverse beam 46 has a square cross section and is fabricated from stainless steel for durability, strength and corrosion resistance. Due to the closed structure of the transverse beams 46, drippings and/or other contaminants cannot become entrapped. Further, the square cross section provides exceptional strength, clearly an advantage in providing a strong, reliable conveyor frame 40.

As shown in FIG. 9 and according to yet another important aspect of the present invention, the guide rails 42 and 44 support and guide the endless conveyor belt 12 in both the feed and return directions. As shown, upper and lower horizontally extending lips 48 and 50, respectively, are provided at each side of the conveyor. The upper lips 48 serve a dual function. More specifically, the upper horizontal surface provides load support. The peripheral edge of the lip 48 engages the arms 27 of side links 26 to guide the belt 12 (see also FIG. 8).

Figure 16:
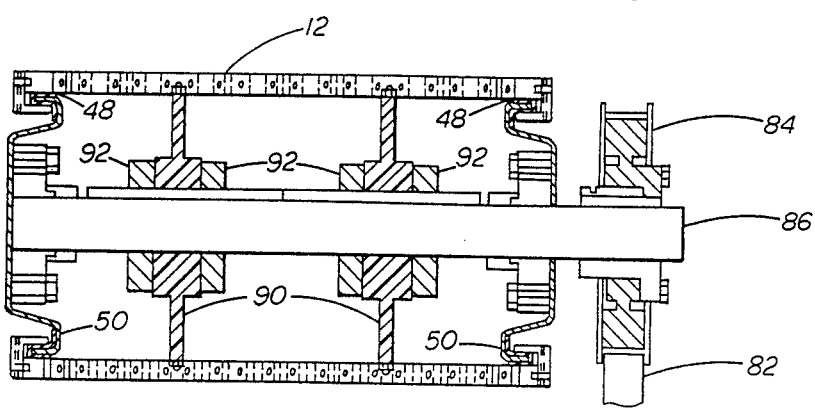
FIG. 16 is a partial cross sectional view of the conveyor system showing the driving sprocket and belt engaging sprocket.

As shown in FIGS. 9 and 16, the conveyor belt 12 is supported in the return direction by the combination of the lower horizontal lips 50 and the tabs 28 on the side link arms 27. The conveyor belt 12 being drawn downwardly by the force of gravity is prevented from falling from the conveyor frame 40 by the tabs 28 that engage the lips 50. This is particularly advantageous at the point of transition between the forward and return runs. The engagement between the tabs 28 and the lip 50 as the belt 12 enters the return run prevents any sagging of the conveyor belt 12. Prior art conveyor systems were designed with a belt sag or catenary to allow for expansion and contraction due to changing temperatures and loads. This was needed because the conveyor belt in prior art systems was not compressible. It can be appreciated, however, that such a catenary presented a safety hazard and prevented efficient positioning of one conveyor above another. Accordingly, the advantage provided by the engagement between the tabs 28 and the lip 50 as the belt 12 transitions towards its return run is clearly seen. This advantage is further enhanced due to the ability of the conveyor belt 12 to compress in the longitudinal direction due to the degree of longitudinal freedom provided as the cross rods 20 slide in transverse slots 22. Thus, the conveyor frame 40 advantageously supports and guides the conveyor belt 12 in both the feed and return directions without additional supporting hardware as required by many of the prior art systems. This is an advantage in reduced equipment cost as well as simplified installation.

The frame 40 also is designed to minimize the buildup of dirt and debris and simplify cleaning as much as possible. In particular, it should be appreciated that the arms 27 and tabs 28 ride on the outside of the frame 40 where they can be easily inspected and cleaned. Further, the frame portion 51 just below the upper lips 48 slopes downwardly. This serves to facilitate liquid runoff and prevent pooling and the build-up of dirt and debris. Of course, this runoff may be collected in a pan 47 provided below the conveyor belt 12 as shown in FIG. 11.

Figure 8:
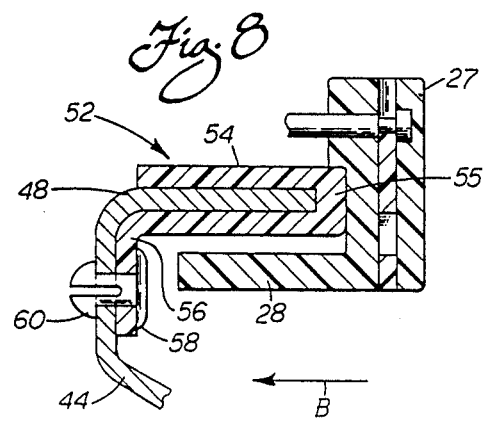
FIG. 8 is a partial cross sectional view of the guide rail utilized in the present invention further showing the wearstrip and the guide tab.

According to still another important aspect of the present invention, wearstrips 52 provide a low friction surface upon which the surfaces of the conveyor belt 12 may freely slide. As best shown in FIG. 8, the wearstrips 52 include a substantially U-shaped guide rail engaging portion 54 for releasably engaging the horizontal lips 48 and 50. Advantageously, the sides of the engaging portion 54 are not exactly parallel but extend towards one another at a small angle (not shown). This slight interference angle coupled with the inherent resiliency of the wearstrip material assures a secure, tight fit of the engaging portion on the guide rail lips 48, 50.

Figure 17:
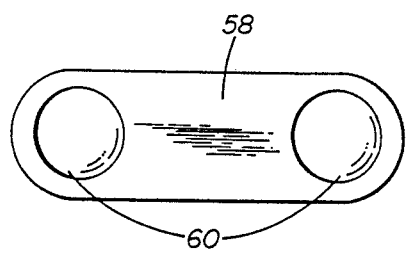
FIG. 17 is a side elevational view of the locking plate showing the rivets.

As further shown in FIG. 8, a depending skirt 56 extends from the engaging portion 54 of the wearstrip 52. The skirt 56 cooperates with a locking plate 58 (see also FIG. 17) as a means for securely fastening the wear strip 52 to the guide rail 42, 44. A pair of rivets 60 fabricated of the same resilient material as the locking plate 58 are passed through a plurality of holes provided in the guide rails 42, 44, the depending skirt 56 and the plate 58. Thus, the rivets 60 and the locking plate 58 securely retain the wearstrip 52 on the guide rails 42, 44.

The locking plate 58 additionally serves as a wear indicating means for the wearstrip. During operation of the conveyor 10, the wearstrips 52 eventually become worn. The wearing action is greatest around bends because the depending arms 27 of the side links 26 are forced into engagement with the outer face 55 of the U-shaped engaging portion 54 so as to effect the desired turning. After the wear reaches a certain extent, it becomes necessary to replace the wearstrips 52 to assure the desired low friction, smooth operation of the conveyor system 10. As the outer face 55 of the wearstrip 52 becomes increasingly worn, the thickness of the face is reduced. Thus, the depending arms 27 of the side links move in the direction of the action arrow B until they eventually contact the surface of the locking plate 58. The surface of the locking plate 58 begins to wear accordingly. Eventually, a portion or the entire length of the locking plate 58 wears through. By the provision of a locking plate 58 and skirt 56 of sharply contrasting colors, a dramatic visual image is presented. More specifically, after the surface of the locking plate 58 has worn through to the underlying skirt 56, a "stripe" appears. Being of a contrasting color, this stripe is readily apparent to the operator.

Advantageously, since the wearstrip 52 is placed on the outside of the guide rails 42, 44, the visual inspection for wear is quite readily accomplished.

In order to determine when the wearstrips 52 must be replaced, the operator simply visually scans the rails 42 and 44. Any wearstrips 52 requiring replacement are readily identifiable. Advantageously, the visual inspection can be quickly accomplished and thus can be performed as often as desired such as before each shift. Further, because the wearstrips 52 face outwardly, they may be relatively simply and quickly replaced. Thus, productivity is effectively increased by providing a system for readily identifying when maintenance is required as well as a system wherein down time for that maintenance is reduced.

As shown in FIGS. 9 and 12, a center rail 62 may be provided to further support the conveyor belt from underneath. The utilization of such a center rail 62 is, of course, optional. It primarily depends on the specific application of the conveyor. For example, where relatively light objects are being conveyed over a conveyor of relatively narrow track, the lips 48 may provide sufficient load support, thus eliminating the need for this additional structural component. Conversely, where relatively heavy objects are being conveyed over a conveyor of relatively wide track, the provision of more than one load supporting center rail 62 may be desirable. As shown, in FIGS. 9 and 12, the center rail 62 includes a U-shaped cover 64 for substantially friction free sliding engagement with the conveyor belt 12.

The center rail 62 is mounted on the transverse beams by a clamp assembly 66. As shown in FIGS. 12 and 13, the clamp assembly 66 includes a substantially U-shaped base 68 that extends around the bottom and two side walls of the transverse beam 46. Four bolts 72 are provided to secure the base 68, a top plate 70 and a retaining clip 74 to the transverse beam 46. Advantageously, the center rail 62 through its cover 64, is retained in a simple snap fit relation with the retaining clip 74 mounted on top of the cover plate 70. As shown in FIG. 12, the retaining clip 74 snaps over a shoulder 76 provided on each side of the cover 64. This snap fit relation allows the center rail 62 to be securely retained without resort to other fastening means such as bolts and/or welding. This has the added advantage of simplified installation as well as replacement.

Figure 14:
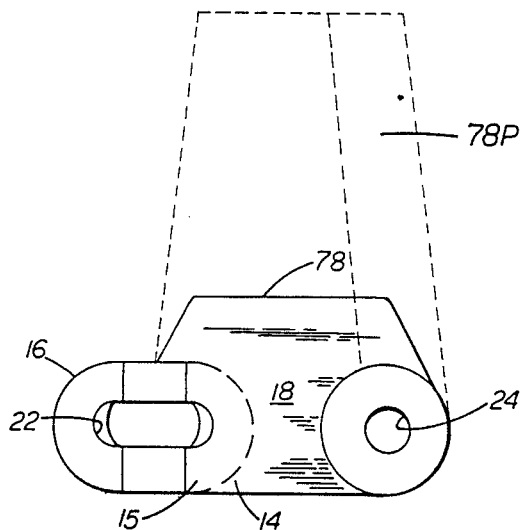
FIG. 14 is a side elevational view of an alternative modular link embodiment including raised fins a further alternative modular link embodiment being indicated by phantom lines showing fins of an even greater height to assist in pushing articles along the travel path.
Figure 15:
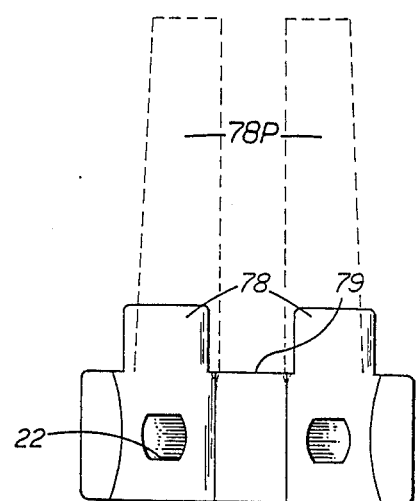
FIG. 15 is an end view of the link of FIG. 14.

In an alternative embodiment of the conveyor system 10, and as shown in FIG. 14, upstanding fins or ribs 78 can be provided along the legs 18. The angle of the fins 78 to forward travel provides a further degree of support for articles placed upon the conveyor. Further, fins 78P of a second or greater height may be provided on one or more rows of links 14, for example, to form pushers to positively convey the articles such as when going up an incline. Alternatively, or in addition, one or more columns of the links 14 can include the fins 78 of an increased height to define two or more individual tracks upon the surface of the conveyor belt 12. By combining the rows and columns, individual compartments or trays can be defined. Additionally, by raising only a leg 18 of the side links 26, a moving conveyor side wall is formed as shown in FIG. 18. In this latter structure, the fins 78S are preferably angled to intermesh or nest together in corners. This substantially prevents the accidental catching of objects in the fins as they proceed around the corners.

It should also be appreciated that by raising only the legs 18 of the links 14 to form the fins 78, the apexes 16 define a plurality of channels 79 at a uniform yet lesser height. These channels can be aligned with the projecting teeth of a stationary transfer comb (not shown) to facilitate smooth and efficient loading/offloading of articles to/from the surface of the conveyor belt. This, of course, serves to enhance the operating efficiency of the conveyor system 10.

In the preferred embodiment and as shown in FIG. 11, an electric motor 80 provides the driving force for the conveyor. The motor 80 is connected by a chain 82 to a driving gear 84 (see also FIG. 16). The gear 84 is connected to a drive shaft 86. A square key 88 is provided to engage the drive shaft 86 and the gear 84 in order to prevent relative slipping and thus maximize torque transmission. Depending on the width of the conveyor belt, one or more conveyor belt engaging sprockets 90 are placed on the drive shaft 86 to impart the drive shaft rotary motion to the conveyor belt 12. The sprockets 90 are held in a transverse position by a pair of locking collars 92, one on each side of the sprocket 90. Here again, the belt engaging sprockets 90 are securely keyed to the drive shaft 86 by the key 88 in order to efficiently and completely transfer the torque.

The belt engaging sprockets 90 may include an integral friction clutch assembly (not shown). The clutch is provided as a fail safe mechanism. More specifically, if for some reason the conveyor belt 12 is stopped or otherwise prevented from freely operating, the friction clutch "disengages" to allow the conveyor belt 12 to idle without damage to the belt 12 or motor 80.

In summary, numerous benefits have been described which result from employing the concepts of the present invention. The conveyor system 10 includes an endless conveyor belt 12 exhibiting smooth, continuous operation even when traversing relatively sharp bends. The side links 26 fulfill the dual function of guiding the conveyor belt 12 and, with the integral locking tab 30, securely retain the cross rod 20 to reliably form the endless conveyor belt 12. The conveyor frame 40 includes two guide rails 42 and 44 to guide and support the conveyor belt in both the feed and return directions. Advantageously, this simplifies installation and reduces overall space requirements, system complexity and cost. The wearstrips 52 provide a low friction surface upon which the conveyor belt 12 rides. The locking plates 58 help securely retain the wearstrips 52 and provide a dramatic visual means for indicating wear of the wear strips. In an alternative embodiment, upstanding fins 78 can be provided on the legs 18 of the links 14 as well as the side links 26. Thus, a multiplicity of channels 79 for engaging a transfer comb can be provided. Fins 78 can also provide a moving side wall, product pusher or individual trays. Thus, it can be seen that the conveyor system 10 of the present invention is well suited to a wide variety of applications.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

What is claimed:

1. A modular link conveyor system, comprising:
   a plurality of modular links, each link including an apex and two legs extending therefrom, said apex further including a slot passing transversely therethrough, said legs further terminating in a distal end portion, each said end including a hole passing transversely therethrough;
   a plurality of transverse connecting means, said connecting means passing through said slots and said holes to engage said modular links together and form a conveyor belt;
   conveyor belt guide means;
   said modular links including side links formed by the inclusion of a depending arm to said modular links for engaging said conveyor belt guide means, each said side link further including integral locking means for engaging said connecting means, said side links performing the dual function of retaining said connecting means in position and cooperatively engaging said conveyor belt guide means to allow said conveyor belt to traverse a bend; and
   drive means to impart motion to said conveyor.

2. The conveyor system of claim 1 wherein said depending arm includes an inwardly extending transverse tab.

3. The conveyor system of claim 1 wherein said links are substantially "V" shaped.

4. The conveyor system of claim 2 wherein said conveyor belt guide means includes a pair of guide rails.

5. The conveyor system of claim 4 wherein said guide rails include an upper and lower lip for guiding said conveyor belt, said lower lip slidingly engaging said transverse tab on said side links to provide an integral belt return.

6. The conveyor system of claim 5 wherein said guide rails further include conveyor wear strip means for relatively low friction sliding engagement with said conveyor belt, said wearstrip means including wear indicating means.

7. The conveyor system of claim 1 wherein said locking means includes a locking tab, and a slot within said side links for receiving said tab.

8. The conveyor system of claim 1 further including a weight supporting means.

9. The conveyor system of claim 8 wherein said weight supporting means includes at least one longitudinally aligned center bar member placed underneath the conveyor belt.

10. The conveyor system of claim 1 wherein said drive means includes at least one sprocket for engaging said modular links and a means for driving said sprocket.

11. The conveyor system of claim 10 wherein said driving means is an electric motor and said sprocket includes an internal friction clutch means.

12. The conveyor system of claim 1 wherein said slot includes relieved corners so that walls of said slot form an arc allowing relatively free movement of said connecting means in said slot.

13. The conveyor system of claim 1 wherein at least one of said legs of said modular links includes an upstanding fin.

14. The conveyor system of claim 13 wherein said upstanding fin traverses the length of said legs.

15. An endless conveyor belt, comprising:
a plurality of modular links, each of said links including an apex and two legs extending therefrom, said apex further including a slot passing transversely therethrough, said legs further terminating in a distal end portion, each said end including a hole passing transversely therethrough;
a plurality of transverse connecting means for engaging said modular links by passing through said slots and said holes and holding said links together so as to form an endless conveyor belt; and
said modular links including a plurality of side links, said side links being formed by including a depending arm on said modular links, each said side links further including integral locking means for engaging said connecting means, said side links performing the dual function of retaining said connecting means in position and cooperatively guiding said conveyor belt to allow said conveyor belt to traverse a bend.

16. The conveyor belt of claim 15 wherein said modular links are substantially "V" shaped.

17. The conveyor belt of claim 15 wherein said locking means includes a locking tab received within a corresponding slot in said side links.

18. The conveyor belt of claim 15 wherein said depending arm of said side links further includes a transversely extending tab.

19. The conveyor belt of claim 15 wherein the openings of said slot are radiused.

20. The conveyor belt of claim 15 wherein said legs include an upstanding fin.

21. The conveyor belt of claim 20 further including pushers formed by providing a row of modular links having fins of an even greater height.

22. The conveyor belt of claim 15 further including a conveyor belt sidewall formed by including an upstanding fin on a leg of said side links.

23. A modular link conveyor system, comprising:
a plurality of modular links, each link including an apex and two legs extending therefrom, said apex further including a slot passing transversely therethrough, said legs further terminating in a distal end portion, each said end including a hole passing transversely therethrough;
a plurality of transverse connecting means, said connecting means passing through said slots and said holes to engage said modular links together and form a conveyor belt;
conveyor belt guide means;
said modular links including side links formed by the inclusion of a depending arm to said modular links for engaging said conveyor guide means, each said side link further including locking means for engaging said connecting means;
drive means to impart motion to said conveyor; and
said slot including relieved corners so that walls of said slot form an arc allowing relatively free movement of said connecting means in said slot and projections are provided extending from said apex and said legs, said projections on adjacent links in said conveyor belt being provided to meet in engagement and substantially limit transverse link motion as said conveyor belt traverses a bend.

24. A modular link conveyor system, comprising:
a plurality of modular links, each link including an apex and two legs extending therefrom, said apex further including a slot passing transversely therethrough, said legs further terminating in a distal end portion, each said end including a hole passing transversely therethrough;
a plurality of transverse connecting means, said connecting means passing through said slots and said holes to engage said modular links together and form a conveyor belt;
conveyor belt guide means;
said modular links including side links formed by the inclusion of a depending arm to said modular links for engaging said conveyor guide means, each said side link further including locking means for engaging said connecting means;
drive means to impart motion to said conveyor; and
said locking means including a locking tab, and a slot within said side links for receiving said tab, said locking tab releasably engaging a locking notch on said connecting means to effect the locking action.

25. An endless conveyor belt, comprising:
a plurality of modular links, each of said links including an apex and two legs extending therefrom, said apex further including a slot passing transversely therethrough, said legs further terminating in a distal end portion, each said end including a hole passing transversely therethrough;
a plurality of transverse connecting means for engaging said modular links by passing through said slots and said holes and holding said links together so as to form an endless conveyor belt;
said modular links including a plurality of side links, said side links being formed by including a depending arm on said modular links, each said side link further including integral locking means for engaging said connecting means; and
said locking means including a locking tab received within a corresponding slot in said side links, said locking means further including a locking notch on said connecting means that is engaged by said locking tab.

26. An endless conveyor belt, comprising:

a plurality of modular links, each link including an apex and two legs extending therefrom, said apex further including a slot passing transversely therethrough, said legs further terminating in a distal end portion, each said end including a hole passing transversely therethrough;

a plurality of transverse connecting means, said connecting means passing through said slots and said holes to engage said modular links together and form a conveyor belt;

said modular links including side links for guiding said conveyor belt;

each said side link further including locking means for engaging said connecting means; and said slot including relieved corners so that walls of said slot form an arc allowing relatively free movement of said connecting means in said slot and projections are provided extending from said apex and said legs, said projections on adjacent links in said conveyor belt being provided to meet in engagement and substantially limit transverse link motion as said conveyor belt traverses a bend.

27. The conveyor system/belt of claims 23, 24, 25 or 26 wherein said links include "V" shaped portions including said apex and legs.

* * * * *